United States Patent
Anderson et al.

(10) Patent No.: US 6,748,232 B1
(45) Date of Patent: Jun. 8, 2004

(54) APPARATUS AND METHOD FOR POWER CONTROL IN A RADIO COMMUNICATION SYSTEM

(75) Inventors: Nicholas Anderson, Wroughton (GB); Rorie O'Neil, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 464 days.

(21) Appl. No.: 09/599,929

(22) Filed: Jun. 22, 2000

(30) Foreign Application Priority Data

Jun. 23, 1999 (GB) .............................................. 9914530

(51) Int. Cl.[7] ................................................ H04Q 7/20
(52) U.S. Cl. ........................ 455/522; 455/69; 375/219
(58) Field of Search ................................ 455/522, 423, 455/454, 127, 434, 515, 572, 69, 517, 419, 13.4, 115, 68, 70, 126, 343, 579, 550, 561, 38.3; 370/318, 342, 441, 252, 335; 375/219, 316, 200, 206, 227

(56) References Cited

U.S. PATENT DOCUMENTS

| | | | | |
|---|---|---|---|---|
| 5,333,175 A | * | 7/1994 | Ariyavisitakul et al. | 455/423 |
| 5,727,033 A | * | 3/1998 | Weaver et al. | 375/358 |
| 5,745,520 A | * | 4/1998 | Love et al. | 375/130 |
| 5,946,346 A | * | 8/1999 | Ahmed et al. | 375/219 |
| 6,173,162 B1 | * | 1/2001 | Dahlman et al. | 455/69 |
| 6,249,683 B1 | * | 6/2001 | Lundby et al. | 455/522 |
| 6,341,224 B1 | * | 1/2002 | Dohi et al. | 455/522 |

FOREIGN PATENT DOCUMENTS

| | | | | |
|---|---|---|---|---|
| EP | 0 709 973 A1 | | 10/1995 | H04B/7/005 |
| EP | 0847146 A2 | * | 10/1998 | H04B/7/005 |
| WO | WO 95/08876 | | 5/1995 | H04B/7/005 |
| WO | WO98/58461 | * | 12/1998 | H04B/7/005 |

OTHER PUBLICATIONS

XP 000736744 Ashwin Sampath, P. Sarath Kumar, and Jack M. Holtzman "On Setting Reverse Link Target SIR in a CDMA System" 3/97 pp. 929–933.

* cited by examiner

Primary Examiner—Pablo N. Tran

(57) ABSTRACT

An apparatus and method for power control in a CDMA system for radio communication between a first station and a second station. At the first station an indication of the received power of signals from the second station is communicated to the second station, and at the second station the indication of received power is received and its transmission power is accordingly modified. An inner control loop produces a power control metric estimate, and an outer control loop produces an outer loop threshold signal (OLT) dependent on received quality of service (QoS). The outer control loop means produces a channel error rate signal (ChER) whereby to track channel variations. The power control is capable of compensating for variations in the channel type and speed. A dual outer-loop scheme allows desired QoS to be maintained for low-FER/high-data-rate services.

6 Claims, 3 Drawing Sheets

APPARATUS AND METHOD FOR POWER CONTROL IN A RADIO COMMUNICATION SYSTEM

FIELD OF INVENTION

This invention relates to power control in radio communications systems such as CDMA cellular telephone systems.

BACKGROUND OF INVENTION

'Outer loop' power control is required in a CDMA system to set an appropriate target for the 'inner loop' power control loop which is just high enough to achieve the desired quality of service (QoS). This target point value will vary as a function of channel propagation (e.g., dispersiveness or user speed). Without effective power control, users perceived QoS will be severely degraded or network capacity will degrade (as a result of excess power transmission when exceeding desired QoS).

In particular, dynamic outer-loop power control is required in a CDMA system in order to adjust the Eb/No (the ratio of energy per bit to noise power spectral density) target point for an inner power control loop in order to track changes in channel propagation in an attempt to maintain constant QoS.

Future generations of cellular telephone services such as the proposed Universal Mobile Telephone System (UMTS) will offer a plethora of different services, each with quite different QoS requirements in terms of delay, bit error rate (BER) and frame erasure rate (FER). This represents a challenge to mobile radio equipment manufacturers who must therefore design their products to be fully adaptable to these various requirements.

Traditional methods for performing outer-loop power control, such as those based on the 'sawtooth' algorithm employed in existing CDMA networks (e.g., the IS-95 cellular standard), are not appropriate for all service types. This is especially true of low FER or high delay services (e.g., video)—which are to be deployed in next generation networks across the world.

SUMMARY OF INVENTION

In accordance with a first aspect of the present invention there is provided an apparatus as claimed in claim 1.

In accordance with a second aspect of the present invention there is provided a method as claimed in claim 6.

BRIEF DESCRIPTION OF DRAWINGS

One embodiment of the invention will now be described, by way of example only, with reference to the accompanying drawings, in which.

DESCRIPTION OF PREFERRED EMBODIMENT

Two-loop (inner-loop and outer-loop) power control is known in CDMA cellular telephone systems. Dynamic outer-loop power control is required in a CDMA system in order to adjust the Eb/No target point for the inner power control loop in order to track changes in channel propagation (e.g., dispersiveness/user speed). Without effective dynamic outer-loop power control, users perceived QoS will be severely degraded or network capacity will degrade (as a result of excess power transmission leading to excessive QoS).

Figure 1:
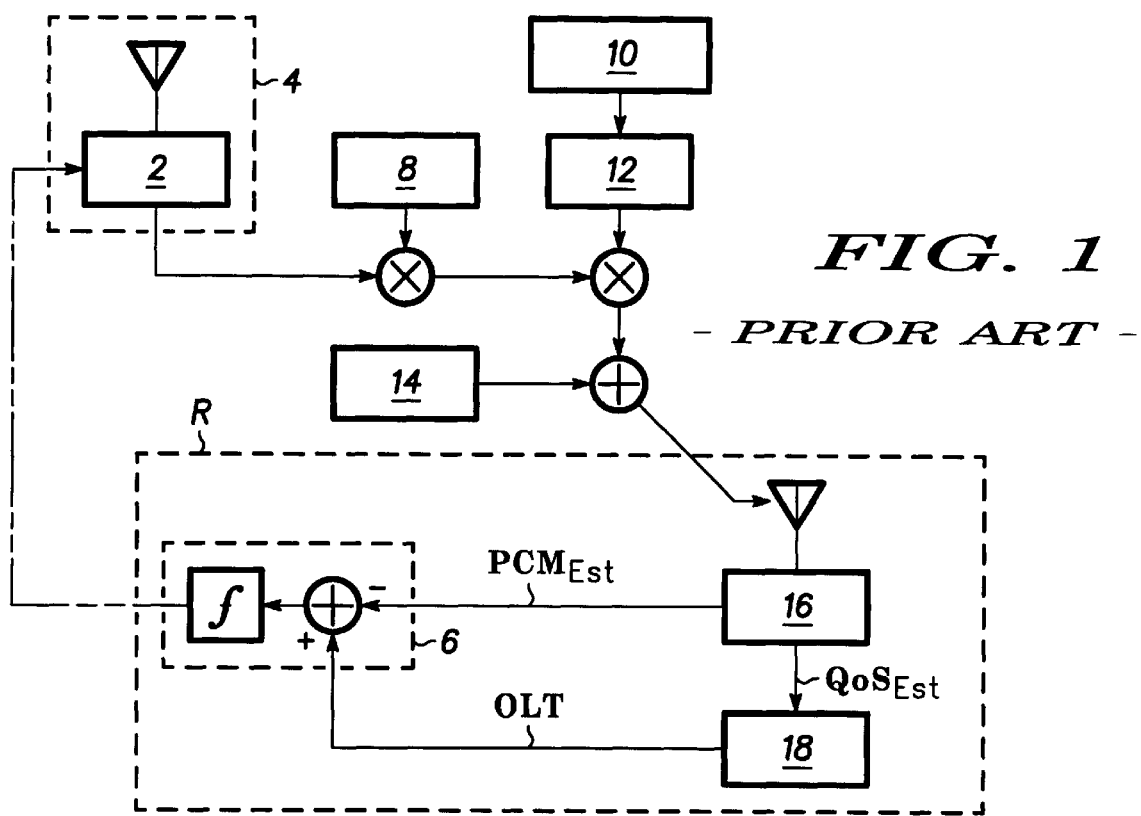
FIG. 1 shows in block diagrammatic form a system incorporating inner- and dynamic outer-loop power control as known in the prior art.

A diagram depicting inner- and dynamic outer-loop power control is shown in FIG. 1. In this arrangement, the transmit power 2 of a transmitter 4 is controlled via an inner loop 6 contained within a receiver unit R. The inner loop 6 includes inputs from the transmitted power, a shadow (slow) fading profile 8, a fast-fading profile 12, and noise interference 14. The fast-fading profile 12 is itself dependent on the channel variation (e.g., speed/dispersion) 10. For the inner loop 6, receiver circuitry 16 produces from the signal received at the receiver R a power control metric estimate ($PCM_{Est}$)—a function of received Eb/No—which is used to modulate the transmit power 2 of the transmitter 4. Additionally, an outer loop 18 is also used to control the transmit power 2 of the transmitter 4. In the outer loop 18 a quality of service estimate ($QoS_{Est}$) is derived from the signal received at the receiver R and is used to produce an outer loop threshold (OLT) signal. The PCM estimate signal $PCM_{Est}$ from the inner loop 6 and the OLT signal from the outer loop 18 are compared and the result is used to control the transmit power 2 of the transmitter 4.

Future generations of cellular telephone services such as the proposed Universal Mobile Telephone System (UMTS) will offer a plethora of different services, each with quite different QoS requirements in terms of delay, bit error rate (BER) and frame erasure rate (FER). This represents a challenge to mobile radio equipment manufacturers who must therefore design their products to be fully adaptable to these various requirements.

Traditional methods for performing outer-loop power control, e.g., the outer power control loop scheme (based on the 'sawtooth' algorithm) commonly deployed in IS-95 CDMA networks, are not appropriate for all service types. This is especially true of low FER or high delay services (e.g., video) which are to be deployed in next generation networks across the world.

The 'sawtooth' algorithm can be described as follows: QoS information in the form of frame cyclic redundancy check (CRC) pass/fail is available from the receiver. The frame quality indicator flag $q_k$ is set to +1 in the event that the $k^{th}$ received frame was bad, and is set to −1 in the event that the $k^{th}$ received frame was good. A function $f(q_k)$ returns the outer loop step increment based on the QoS input information $q_k$ where:

$$f(q_k)=-\Delta \text{ for } q_k=-1 \text{ and } f(q_k)=+K\Delta \text{ for } q_k=+1 \tag{1}$$

That is, for every good frame received the OLT is decreased by an amount $\Delta$, whereas for every bad frame received the OLT is increased by an amount $K\Delta$. Using the given notation the algorithm can be expressed in a more mathematical form as:

$$OLT(k+1) = OLT(k) + \frac{1}{2}\{(q_k + 1)K\Delta + (q_k - 1)\Delta\} \quad (2)$$

A value of K can be derived as a function of the desired FER:

$$K = \frac{1 - 2FER_{Target} + 1}{1 + 2Fer_{Target} - 1} = \frac{1}{FER_{Target}} - 1 \quad (3)$$

Therefore, suppose for example an FER of 1% is desired, then for every good frame received the algorithm decreases the OLT by an amount $\Delta$, whilst for every bad frame received the OLT is increased by $99\Delta$. This results in the desired FER being attained.

An unwanted transmission power overhead, that is a function of $K\Delta$, is required by the sawtooth algorithm in order for it to attain the desired $FER_{Target}$. Thus, it will be understood that the excess power transmitted due to the dynamic outer-loop increases with $K=1/FER_{Target}$ and this is where one of the problems with low FER UMTS services becomes apparent. Long constraint delay (LCD) data services have been designed within the UMTS framework to provide QoS's which are equivalent to service frame erasure rates (SFER's) of around $10^{-3}$. Thus, as there is a lower limit restriction on $\Delta$ for channel tracking purposes, the step-up size $K\Delta$ becomes very large and much excess power must be transmitted in order to meet QoS. This would significantly reduce network capacity, especially when considering the fact that each high data rate LCD user consumes much more of the power resource within a cell than each low data rate (e.g., speech) user.

The problem here can be summarised in a more generic form. The outer loop exists to track the channel variations in speed and dispersion which may be occurring over a time (e.g., 0.5–5 seconds). As an example, a vehicular user may transition from 120 kmph to close to 0 kmph in less than 5 seconds, where the change in Eb/No at QoS will perhaps be of the order of 2 dB's. The 'sawtooth' outer-loop algorithm is driven solely by CRC fail information which, by definition, only occurs very infrequently (e.g., $SFER=10^{-3}$). Considering a typical UMTS LCD circuit-switched data service with service frame duration of 80 ms, this gives rise to one service frame erasure approximately every 1.5 minutes for $SFER \approx 10^{-3}$! Therefore, for any reasonable step-up ($K\Delta$) size, the outer loop will be unable to track the channel variations adequately since the corresponding step-down size ($\Delta$) will have to be set to a very small value. In practical terms the 'sawtooth' algorithm is therefore only applicable to low delay services with service frame erasure rates of $10^{-2}$ or higher, or for non-real-time (NRT) services employing automatic repeat request (ARQ). For real-time (RT) services with QoS requirements for low error probability another approach is required.

Thus it will be understood that a different approach is required for LCD services that have a potentially long service frame duration and/or very low SFER QoS targets. In these services the influx of quality information into the outer-loop mechanism is inherently of too low a frequency to adequately track any channel variations without resorting to transmitting large amounts of excess power. For any practical value of $\Delta$ the excess power transmission required by the 'sawtooth' algorithm will be very high due to the large value that must be assumed by K. Therefore, a more frequent measure of link quality is required to track the channel.

This invention is based on the realisation that the channel bit error rate (e.g., after 'RAKE' maximum ratio combining (MRC), but before channel-decoding) corresponding to a particular post channel-decoding QoS is relatively independent of the channel type and speed (it will be understood that RAKE MRC is a technique well known in CDMA systems). That is to say, for any particular QoS, there exists a corresponding channel error rate (ChER) that is by-and-large insensitive to variations in the channel type and speed. Thus, if the ChER at the desired QoS could be found, it would provide a continuous measure to track channel variations in the absence of any other information. However, it may not be desirable to have to set a specific desired ChER for each service and data rate and some automated ChER-target-setting process may be required.

Figure 2:
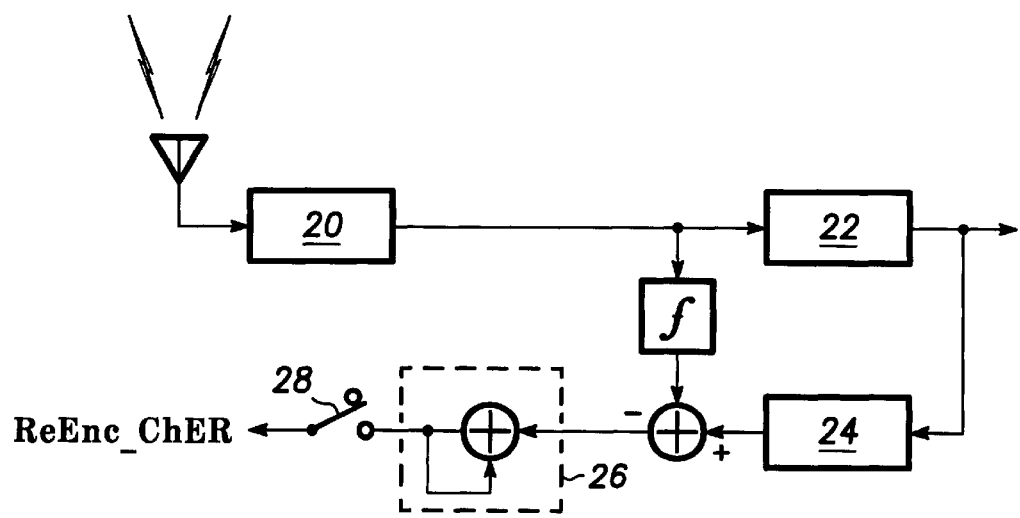
FIG. 2 shows in block diagrammatic form a scheme for re-encoded channel error rate measurement as employed in the preferred embodiment of the present invention.

Referring now to FIG. 2, an accurate estimate of the ChER can be obtained from the receiver by comparing a re-encoded version of the decoded information bits with a hard decision on the soft channel bits emanating from the receiver/demodulator. In the scheme of FIG. 2, a receiver/demodulator 20 supplies output to a channel decoder 22 which produces at its output presumed information bits. The channel decoder output is applied to a channel encoder 24 which produces at its output a re-encoded version of the presumed information bits. The output of the channel encoder 24 is compared to the output from the receiver/demodulator 20 and applied to an integrator 26. The output from the integrator 26 is sampled and reset via a switch 28 at the end of each desired measurement period to produce at its output a re-encoded channel error metric (ReEnc_ChER) commensurate with the received signal portion contained within the measurement period.

It will be appreciated that for certain coding schemes (e.g., recursive) it may be desirable for the re-encoded input to the comparator to be derived other than directly from the decoded bits. A suitable alternative re-encoded metric could be obtained, for example, by concatenating the codewords corresponding to the most likely path through a decoder trellis. At the QoS point, the ReEnc_ChER will be closely representative of the real channel error rate ChER (since, by definition, the decoded output contains very few errors). In addition, ChER's of between 10% and 20% are typical for turbo-coded LCD services at BER's of $10^{-6}$ and so the effects of the infrequent errors in the decoded bits on the re-encoded metric are very-small.

Figure 3:
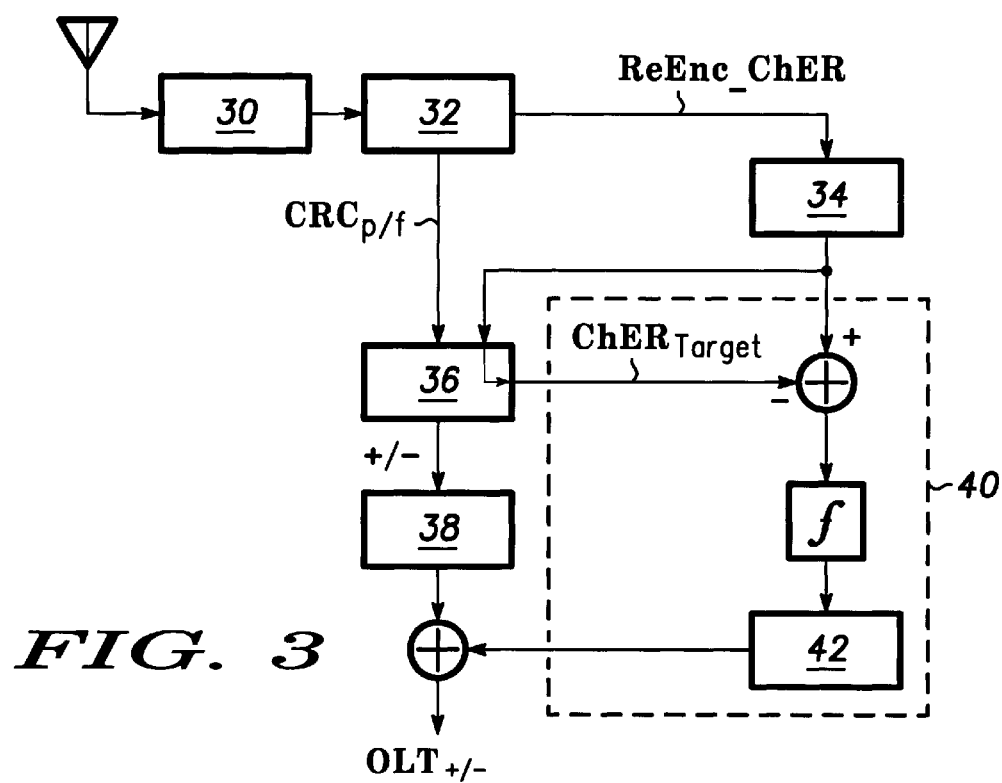
FIG. 3 shows in block diagrammatic form a system in accordance with a preferred embodiment of the present invention incorporating a dual outer loop power control scheme (DOLAP)

Referring now also to FIG. 3, based upon the above principle, an outer loop algorithm has been developed that has two constituent loops and for convenience will subsequently be termed the 'dual-loop algorithm' or the 'Dual Outer-Loop Algorithm for Power-control' (DOLAP). As shown in FIG. 3, a received signal is applied to the information bit recovery arrangement of FIG. 2 to produce a re-encoded channel error rate metric (ReEnc_ChER) and a cyclic redundancy check (CRC) pass/fail signal ($CRC_{p/f}$) which is applied to an 'outer-loop 1' (36). The ReEnc_ChER signal is applied to an 'outer-loop 2' (40) where it is filtered and compared to a target channel error rate signal ($ChER_{Target}$) from the 'outer-loop 1' (36) to drive a 'small gain step' incrementer/decrementer 42. The 'outer-loop 1' (36) also produces an output which drives a 'big gain step' incrementer/decrementer 38. The outputs from the 'small gain step' incrementer/decrementer 42 and the 'big gain step' incrementer/decrementer 38 are combined to produce a OLT increment/decrement signal ($OLT_{+/-}$) which is used to derive the inner power control loop threshold signal OLT.

Thus, the 'outer-loop 1' (36) monitors QoS information in the form of CRC pass/fail events. In response to the $CRC_{p/f}$ input, 'outer-loop 1' (36) then sets a target channel error rate (ChER$_{Target}$) for the 'outer-loop 2' (40), and also outputs relatively large OLT increment/decrement adjustments ($\Delta_{big}$). In the absence of further 'outer-loop 1' OLT adjustment events, outer-loop 2 then attempts to maintain the specified ChER$_{Target}$ by comparing a filtered version of ReEnc__ChER to ChER$_{Target}$ and adjusting the OLT for the inner PC loop in smaller steps ($\Delta_{small}$) up or down. $\Delta_{big}$ and $\Delta_{small}$ may represent multiplicative adjustments to the OLT in the linear domain, or additions in the logarithmic domain (in a similar manner as described for the 'sawtooth' algorithm).

It may be beneficial to take an average of the re-encoded channel error rate metric (ReEnc__ChER) over a longer period in order to reduce its variance before it is used by outer-loop 2. This filtering time duration is irrespective of the service frame duration and data rate.

Considering the outer-loop 1 in more detailed description), the outer-loop 1 performs two functions:
  (i) Monitoring Service Frame Quality-of-Service Indicator (SFQI) information and adjusting the OLT by steps +/-$\Delta_{big}$ accordingly; and
  (ii) Determining ChER$_{Target}$ for outer-loop 2.

Considering firstly the outer-loop 1 function of monitoring SFQI information and adjusting the OLT, the algorithm for this process is as follows. SFQI$_n$ indicates whether the n$^{th}$ service frame was found in error. A value of +1 indicates an error whereas a value of −1 indicates a good service frame. On encountering a SFQI indicating a CRC fail, the process checks to see whether a service frame in the last T service frames has also been found in error. If so, the OLT is adjusted by an amount +$\Delta_{big}$. Upon a CRC fail, a counter is reset. In the absence of further errors this counter increments every subsequent service frame until it exceeds the value T. When this happens, T service frames have been received error-free, and the OLT is adjusted by an amount −$\Delta_{big}$. The counter is again reset upon this event.

The algorithm can be expressed algebraically as:

$$[OLT(n)] = [OLT(n-1)] * \frac{\Delta_{big}}{2}\left(SFQI_n + \frac{T-counter}{\sqrt{(T-counter)^2}}\right) \quad (4)$$

The step size value for $\Delta_{big}$ should be large enough to give an appropriate increment upon an undesired service frame erasure event, but must also be small enough so as to prevent much excess transmission of power above the QoS operating point. A typical value for $\Delta_{big}$ may be 0.25 dB. Although recommendations for step sizes are given in this example, optimisation of both $\Delta_{big}$ and $\Delta_{small}$ could be performed.

Figure 4:
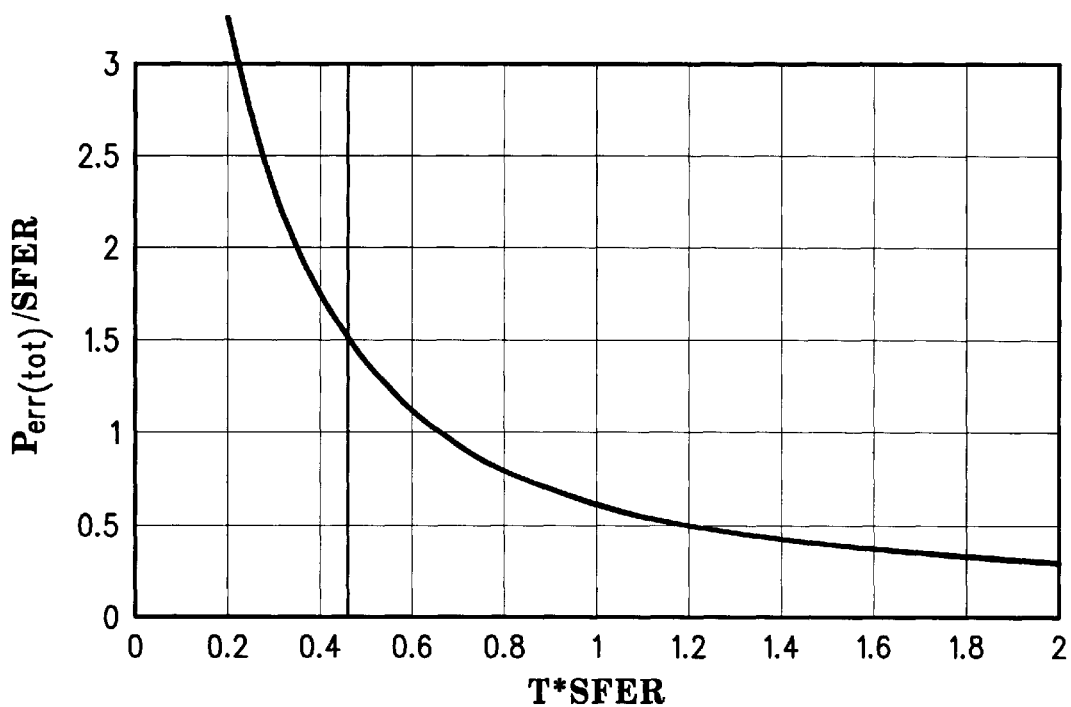
FIG. 4 shows a graph used in deriving an appropriate value for a counter parameter of the system of FIG. 3.

The value of T that results in the desired SFER has been found via modelling this outer-loop 1 process as a discrete 3-state Markov process. This modelling produces the graph of FIG. 4, which shows (T*SFER) vs. (P$_{err(tot)}$/SFER). From this graph it can be seen that in order to achieve the desired SFER$_{Target}$ the counter-related parameter T (in equation (4)) must be selected to be:

$$T = \frac{1}{SFER_{Target}} \times 0.66 \quad (5)$$

Figure 5:
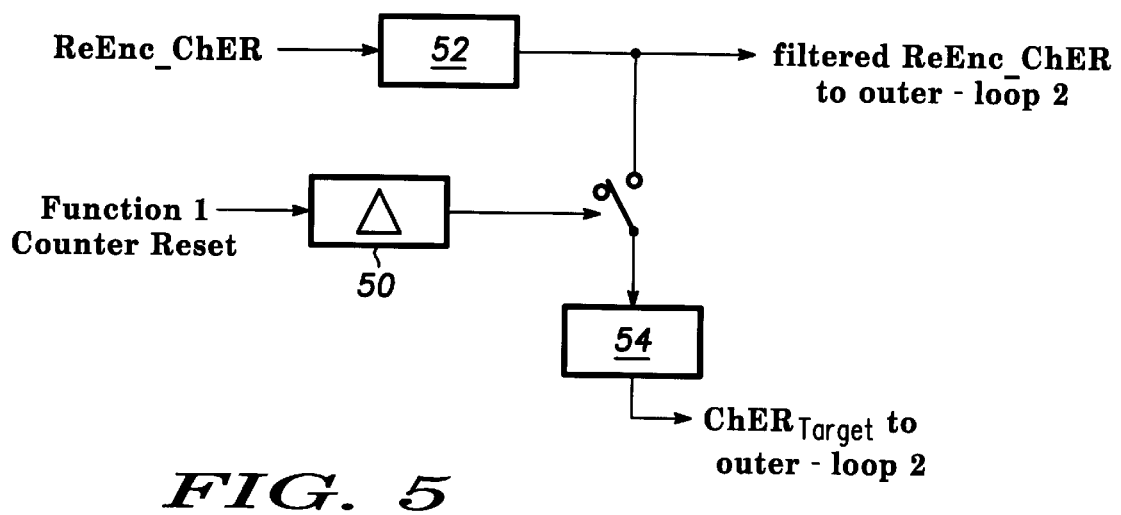
FIG. 5 shows a block schematic diagram of a target channel error rate ($ChER_{Target}$) update scheme employed in the system of FIG. 3.

Considering now the second function of outer-loop 1 of determining ChER$_{Target}$ for outer-loop 2, it is to be noted that the above-discussed algorithm for the first outer-loop 1 function (monitoring SFQI information and adjusting the OLT) has a 'do nothing' state when neither a big step up nor a big step down event has occurred. In these periods, outer-loop 2 will attempt to maintain a constant channel error rate by adjusting the OLT in small steps up or down in response to a comparison of channel error rate estimate with the channel error rate target. ChER$_{Target}$ is set subsequent to a counter reset in the first function (i.e., when a big step up or down has been made). Referring now also to FIG. 5, the following ChER$_{Target}$ update process occurs. When a counter reset in the first function occurs (i.e., when a big step up or down has been made), this condition is detected, and a wait period 50 (equal to the delay of the re-encoded channel error rate filter 52) is entered, during which ReEnc__ChER is sampled and averaged (which is occurring anyway for outer-loop 2). After this delay period, the output of the ReEnc__ChER averaging filter 52 is input into a ChER$_{Target}$ filter 54 that is clocked following every counter reset in the first function. The output of this filter is the actual ChER$_{Target}$ to be used by outer-loop 2.

Thus, the combined operation of outer-loop 1 and outer-loop 2 can be summarised as follows. When the first function of outer-loop 1 decides that a relatively large step change in the OLT is required, it is implemented and the new channel error rate is measured. Once filtered using previous such measurements, this is then assumed to be a new acceptable channel error rate target for outer-loop 2 to track. In this way, the outer power control loop is able to adaptively determine the average channel error rate at the desired QoS point for that service (these can be very different for different services). Any variations in the channel can then be tracked quickly by outer-loop 2 without the need for further CRC event information (which by definition arrives at a very slow rate).

It will be understood that the various filter parameters may need to vary for different service frame durations and different values of SFER$_{Target}$ since these affect the average rate and variance of input information into the ChER$_{Target}$ filter.

An initial channel error rate target must be set at the start of a call. The target will be updated following a counter reset in the first function of outer-loop 1. It is desirable to set this initial target to a high error rate (higher than any service ChER at desired QoS) such that in the event that the initial OLT setting is too high outer-loop 2 will drive down the power until the first error is encountered. Following this the process will automatically set its own suitable ChER$_{Target}$. Care must be taken therefore to ensure that the initial value of ChER$_{Target}$ does not enter the ChER$_{Target}$ filter. In the case that the initial OLT target is too low, errors will be encountered and the process will adapt itself accordingly.

The function performed by outer-loop 2 is very simple. It accepts two inputs: (i) the filtered version of ReEnc__ChER, and (ii) ChER$_{Target}$. Outer-loop 2 simply compares these two values and adjusts the OLT accordingly.

It may be desirable that the value of $\Delta_{small}$ per second is similar to the step-down size $\Delta$ per second used in the 'sawtooth' algorithm for speech services in order to ensure that both algorithms have similar channel-tracking capability.

Simulation tests have shown that power control utilising the above-described dual loop (DOLAP) scheme allows desired QoS to be maintained for low-FER/high-data-rate services. The simulation tests also showed that power control utilising the above-described dual loop (DOLAP) scheme coped well with changes in channel conditions, the control loops adapting to the changes without the need for CRC failure.

It will be appreciated that although the invention has been described above in the context of a CDMA system, the system does not need to be exclusively CDMA. For example, the invention could be used in a hybrid CDMA/TDMA system.

We claim:

1. An apparatus for power control in a system for radio communication between a first station and a second station, the apparatus comprising:

power indication means at the first station for communicating to the second station an indication of the received power of signals at the first station; and power control means at the second station for receiving the indication of received power from the first station and for accordingly modifying its transmission power;

wherein the power control means comprises inner control loop means for producing a power control metric; outer control loop means for producing an outer loop threshold signal (OLT) dependent on received quality of service (QoS), and wherein the outer control loop means comprises means for producing a channel error rate signal (ChER) whereby to track channel variations, the channel error rate signal relating to an error rate of received information bits prior to error decoding and the outer loop threshold signal being dependent on the channel error rate signal.

2. An apparatus as claimed in claim 1 wherein the means for producing a channel error rate (ChER) signal comprises:

means for producing an information signal containing coded information bits;

means for decoding received information bits from the information signal, means for re-encoding the decoded information bits; and means for comparing the re-encoded version of the decoded information bits with the information signal to produce the channel error rate signal.

3. An apparatus as claimed in claim 1 wherein the outer control loop means comprises:

first outer loop means for monitoring cyclic redundancy check pass/fail events and in response thereto setting a target channel error rate; and second outer loop means for receiving the channel error rate signal and for comparing it with the target channel error rate signal from the first outer loop means.

4. An apparatus as claimed in claim 3 wherein the first outer loop comprises means for automatically updating the target channel error rate.

5. An apparatus as claimed in claim 1 wherein the system is a code division multiple access (CDMA) system.

6. A method of controlling power in a system for radio communication between a first station and a second station, the method comprising:

producing at the first station and communicating to the second station an indication of the received power of signals at the first station; and receiving at the second station the indication of received power from the first station and accordingly modifying the second station's transmission power;

wherein the step of producing at the first station comprises producing in an inner control loop a power control metric; producing in an outer control loop an outer loop threshold signal (OLT) dependent on received quality of service (QoS), and wherein the step of producing the loop threshold signal (OLT) comprises producing a channel error rate signal (ChER) whereby to track channel variations, the channel error rate signal relating to an error rate of received information bits prior to error decoding and the outer loop threshold signal being dependent on the channel error rate signal.

* * * * *